Oct. 29, 1957   D. S. CAMPBELL   2,811,263
DRAFT GEAR COMBINING HELICAL SPRINGS, RUBBER
SPRINGS, AND FRICTION
Filed Oct. 28, 1953   4 Sheets-Sheet 2
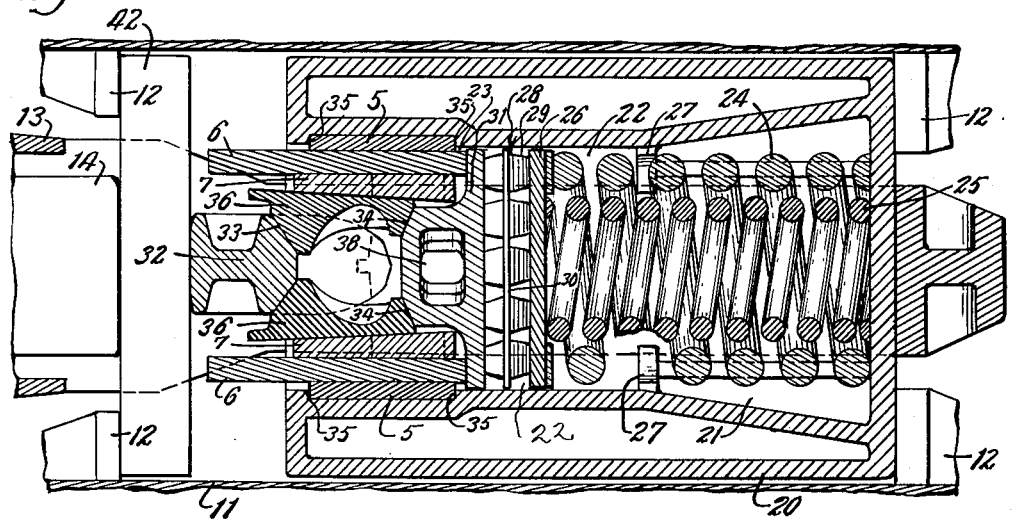
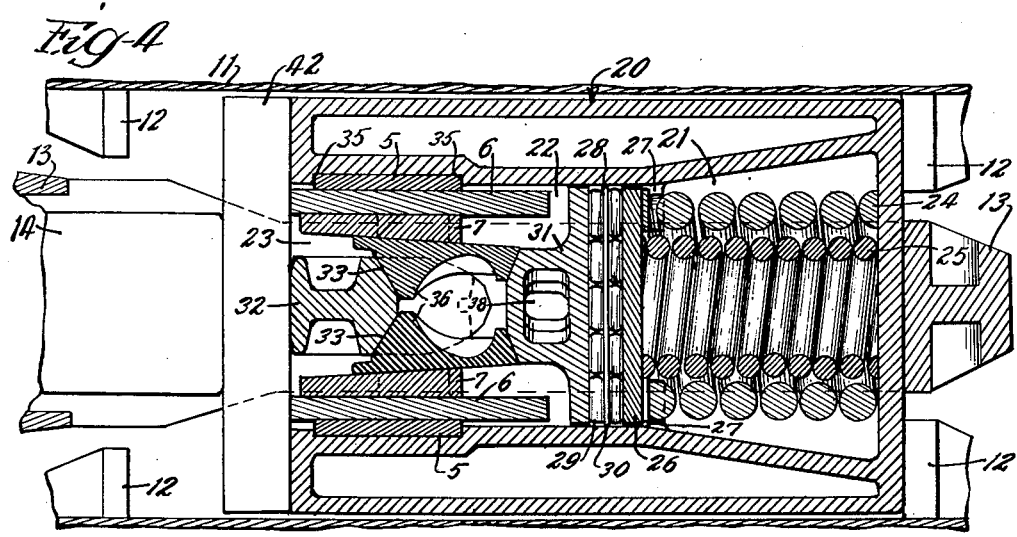
INVENTOR.
David S. Campbell
BY
Mann, Brown and Hansmann
Attys.

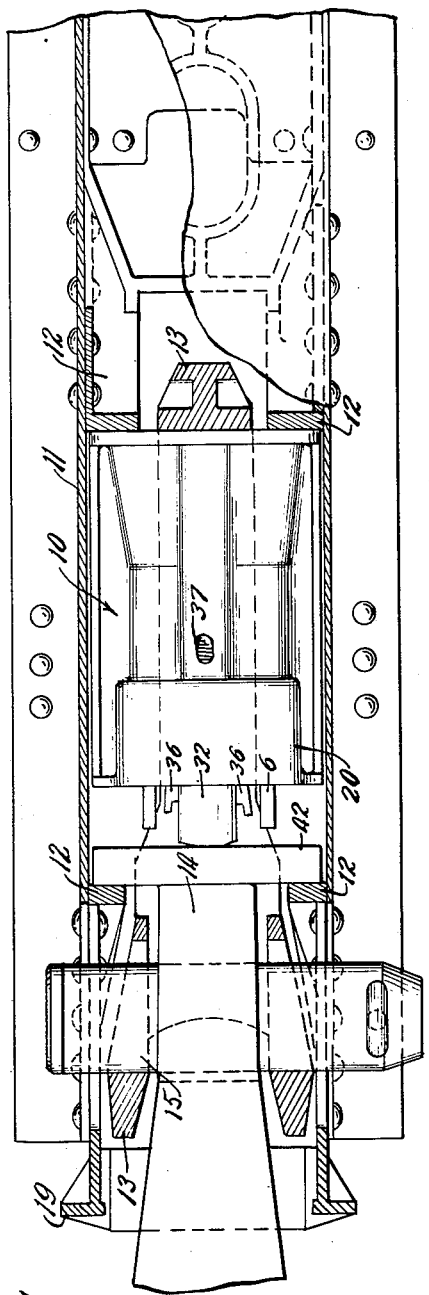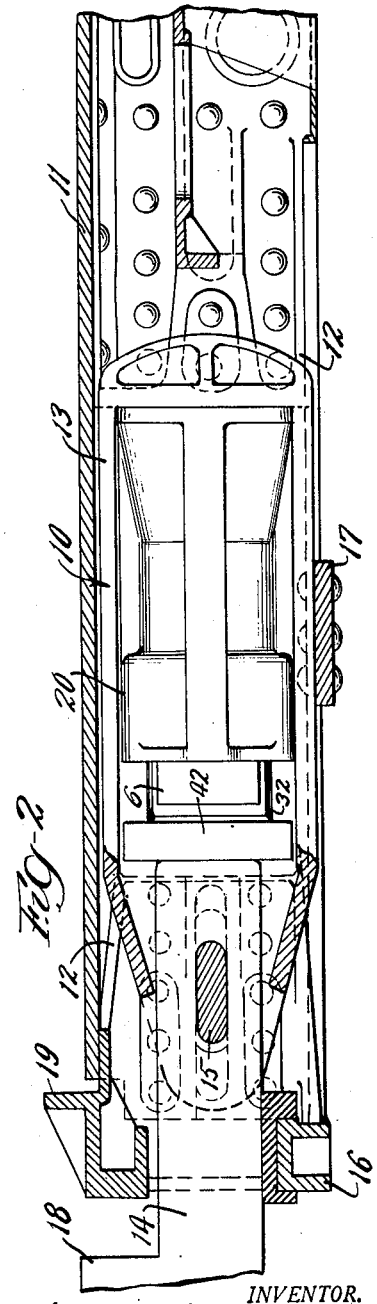

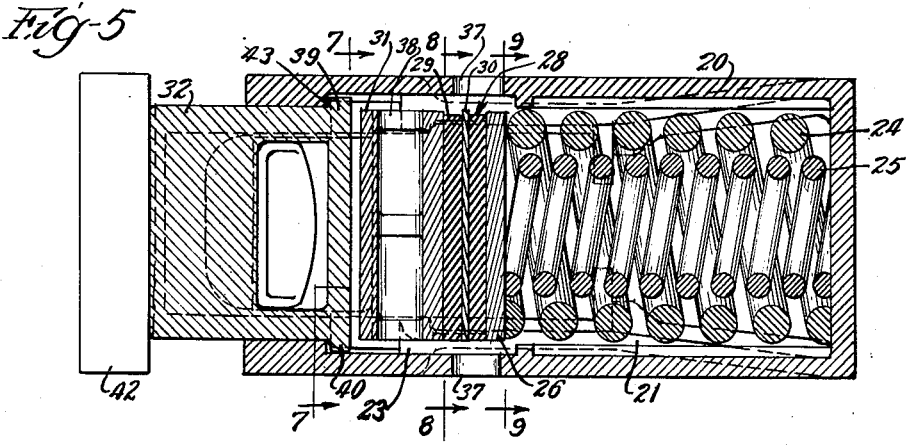
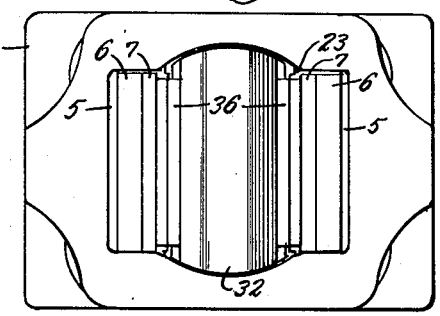
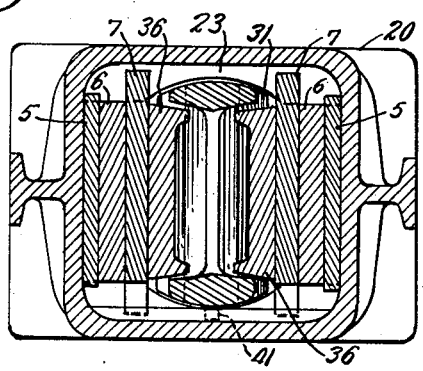
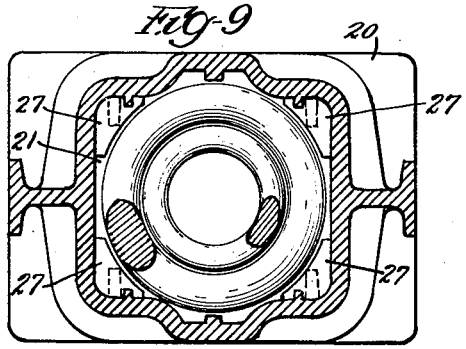
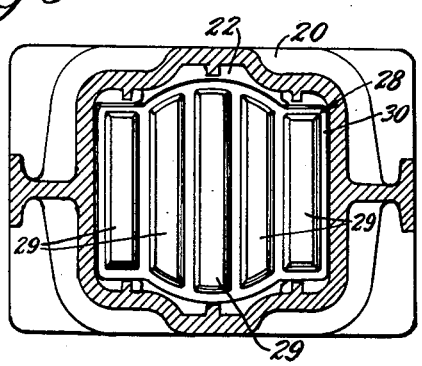

Oct. 29, 1957           D. S. CAMPBELL           2,811,263
DRAFT GEAR COMBINING HELICAL SPRINGS, RUBBER
SPRINGS, AND FRICTION
Filed Oct. 28, 1953                         4 Sheets—Sheet 4
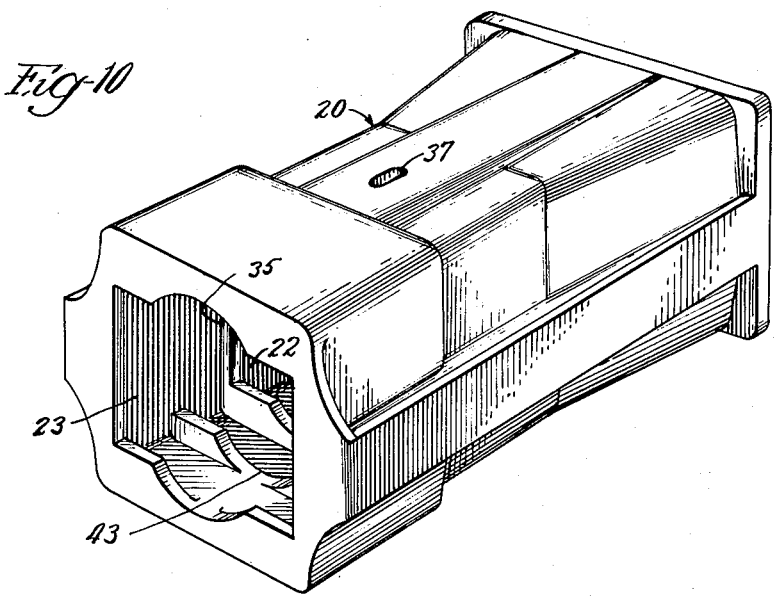
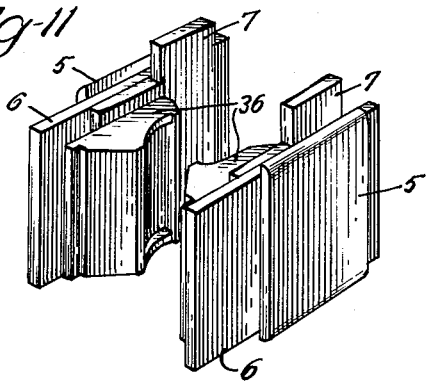
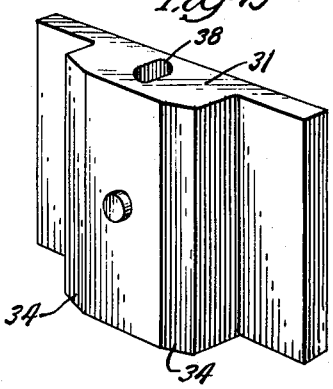
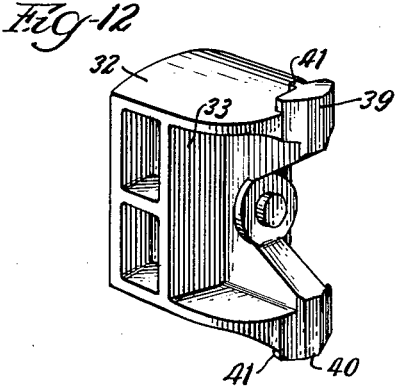
INVENTOR.
David S. Campbell
BY
Mann, Brown and Hansmann
Attys.

2,811,263

DRAFT GEAR COMBINING HELICAL SPRINGS, RUBBER SPRINGS, AND FRICTION

David S. Campbell, Glen Ellyn, Ill., assignor to Cardwell Westinghouse Company, a corporation of Delaware Application October 28, 1953, Serial No. 388,790

5 Claims. (Cl. 213—34)

This invention relates to draft gears for railroad cars, and has for its principal object to provide a gear having high capacity in which the energy absorption increases as the gear closes and the recoil on release is absorbed by internal resistance.

Generally speaking, this is accomplished by using a coil spring cushioning element, a rubber spring cushioning element, and a friction cushioning element in tandem.

Further objects and advantages of the invention will appear as the description is read in connection with the accompanying drawings, in which:

Fig. 1 is a horizontal section through familiar parts of a freight car showing the draft gear applied;

Fig. 2 is a vertical section of the same;

Fig. 3 is an enlarged horizontal section through the draft gear and portions of the draft rigging showing the gear in full release;

Fig. 4 is a similar view showing the draft gear compressed in buff;

Fig. 5 is a vertical section through the draft gear and the front follower, the draft gear being in full release;

Fig. 6 is a front end view of the draft gear;

Figs. 7, 8, and 9 are cross sections on the lines 7—7, 8—8, and 9—9 of Fig. 5;

Fig. 10 is a perspective view of the draft gear housing;

Fig. 11 is a perspective view of intercalated friction plates and friction shoes forming a part of the friction cushioning element;

Fig. 12 is a perspective view of the plunger; and

Fig. 13 is a perspective view of the combined follower and edge.

But these drawings and the corresponding description are for the purpose of illustrative disclosure only, and are not intended to impose unnecessary limitations on the claims.

In Figs. 1 and 2, the draft gear, indicated generally at 10, is shown in the familiar surroundings of center sills 11, draft gear lugs 12, draft yoke 13, coupler butt or shank 14, draft key 15, coupler carrier iron 16, draft gear carrier iron 17, coupler horn 18, and striking plate 19 (all corresponding to Fig. 10.51 of Car Builders' Cyclopedia, 1946, p. 944). These parts are so familiar that no specific description is deemed necessary.

The draft gear housing, generally indicated by 20, includes a rear chamber 21, an intermediate chamber 22, and a front chamber 23 open at the front.

In the rear chamber, there is a helical spring cushioning element including outer and inner springs 24 and 25 and a follower 26. Internal limit stops 27 serve to check the rearward motion of the follower 26, and to protect the springs from going solid.

A rubber spring element 28 including rubber blocks 29 secured to an intermediate plate 30 of familiar construction is in the intermediate chamber 22 in thrust relation to the follower 26.

A combined follower and wedge 31 is in front of the rubber cushioning element 28 and in thrust relation to it.

In the front chamber 23, there is a friction cushioning element including a plunger 32 having wedge surfaces 33 spaced from but opposed to inclined surfaces 34 on the combined follower and wedge 31.

Intercalated friction plates 5, 6, and 7 are arranged in groups at each side of the casing, 5 and 7 being held stationary by flanges 35 in the casing.

A pair of friction shoes 36 in thrust relation to the wedge surfaces 33 and 34 on the plunger and the combined follower and wedge cooperate with the inner inclined surfaces of the stationary plate 7 to put pressure on the intercalated plates.

For convenience in assembly, the housing 20 and the combined follower and wedge 31 are provided with openings 37 and 38.

After the springs 24 and 25, the follower 26, the rubber cushioning element 29, and the combined follower and wedge 31 have been inserted from the front end, they are compressed enough to bring the openings 37 and 38 in alignment, and an assembly pin is inserted to hold them compressed.

Afterwards, the intercalated plates 5 and 6 are inserted, followed by the plunger 32, which is first rotated toward the horizontal, and then to the vertical, and then by the wedge shoes 36; and finally the movable plates 6 are pushed into position.

This accomplished, the gear is then slightly compressed and the assembly pin removed.

The plunger 32 is provided with oppositely directed arms 39 and 40, and these have forwardly directed sharp projections 41 adapted to cooperate with the rib 43 inside of the housing. When first assembled, those projections 41 shorten the overall length of the draft gear enough to permit it to enter the draft gear pocket, but after a few service operations the projections notch into the rib 43 and give the gear full release (see particularly Figs. 5, 7, and 12).

Operation

Upon receiving the thrust in buff, the plunger 32, acting through the wedge shoes 36 and the combined follower and wedge 31, puts compression on the intermediate rubber spring and the rear springs 24 and 25. At the same time, it puts pressure on the intercalated plates with the result that the thrust is resisted and its energy absorbed by friction and by compressing the rubber unit 28 and the coil springs 24 and 25. For a limited movement on the order of, for example, ½", that is sufficient to give easy cushioning for ordinary buffing shocks.

Upon additional travel, the front follower 42 comes in contact with the movable plate 6 and adds friction due to the movement of the plates 6 between the plates 5 and 7.

When the shock is sufficient to bring the follower 26 against the limit stops 27, the rear springs are protected from further compression; but the rubber spring still has considerable capacity for an appropriate small increment of travel, and during which it is assisted by the increased friction between the intercalated plates and other parts of the friction cushioning element.

On release, the spring elements urge the parts toward full release under control of the friction elements, which absorb the energy and restrain rebound.

In one particular embodiment which has been found satisfactory, the rubber spring cushioning element provides a maximum travel of 2⅝", increasing its resistance rapidly as it is compressed.

The surfaces 34 are best inclined on the angle of repose of the metal to promote movement.

I claim:

1. In a draft gear for mounting in the draft pocket of railway cars, said pocket including spaced front and rear lugs; a housing having a transverse wall at one end and having the other end open, said housing having substantially longitudinally extending inwardly facing, stationary friction surfaces therein; a front follower movable longitudinally relative to said housing; said housing and follower having cooperating abutment surfaces limiting relative closing movement therebetween; a first cushioning element having a given solid height in said housing bearing against the transverse wall; a second cushioning element in said housing forwardly of said first cushioning element; said housing having internal limit stops spaced from said transverse wall a distance greater than the solid height of said first cushioning element; an intermediate follower between said first and second cushioning elements and having an abutment surface facing said transverse wall for coaction with said limit stops to limit travel of said intermediate follower toward said transverse wall; and a thrust transmitting friction cushioning element movable in said housing and bearing against the front of said second cushioning element and projecting through said open end in thrust engagement with said front follower; said friction cushioning element including laterally urged outwardly facing friction surfaces cooperating with said first-mentioned friction surfaces, the arrangement being such that said friction cushioning element, said second cushioning element, and said first cushioning element act in tandem through said front follower and said housing to react between said front and rear lugs, with the longitudinal dimensions and cushioning characteristics of said tandem acting cushioning elements being such that, when the gear is in its release condition, the cooperating abutment surfaces of said front follower and housing are spaced apart a greater distance than are the abutment surface of said intermediate follower and said limit stops to the end that said first cushioning element is prevented from going solid and the final increment of gear closure is resisted by the second cushioning element.

2. In a draft gear for mounting in the draft pocket of railway cars, said pocket including spaced front and rear lugs: a housing having a transverse wall at one end and having the other end open, said housing having substantially longitudinally extending, inwardly facing, stationary friction surfaces therein; a front follower movable longitudinally relative to said housing, said housing and follower having cooperating abutment surfaces limiting relative closing movement therebetween; a first cushioning element having a given solid height in said housing bearing against the transverse wall; a second cushioning element in said housing forwardly of said first cushioning element; an intermediate follower between said first and second cushioning elements having a spring seat surface engaging said first cushioning unit and an abutment surface facing said transverse wall; said housing having an abutment surface intermediate said transverse wall and said intermediate follower for coaction with the abutment surface of said intermediate follower to limit travel of said intermediate follower toward said tranverse wall; and a thrust transmitting friction cushioning element movable in said housing and bearing against the front of said second cushioning element and projecting through said open end in thrust engagement with said front follower, said friction cushioning element including laterally urged, outwardly facing, friction surfaces cooperating with said first mentioned friction surfaces; the arrangement being such that said friction cushioning element, said second cushioning element, and said first cushioning element act in tandem through said front follower and said housing to react between said front and rear lugs, with the longitudinal dimensions and cushioning characteristics of said tandem acting cushioning elements being such that, when the gear is in its release condition, the cooperating abutment surfaces of said front follower and housing are spaced apart a greater distance than are the cooperating abutment surfaces of said intermediate follower and said housing to the end that said first cushioning element is prevented from going solid and the final increment of gear travel is resisted by the second cushioning element.

3. In a draft gear for mounting in the draft pocket of railway cars, said pocket including spaced front and rear lugs: a housing having a transverse wall at one end and having the other end open, said housing having substantially longitudinally extending, inwardly facing, stationary friction surfaces therein; a front follower movable longitudinally relative to said housing, said housing and follower having cooperating abutment surfaces limiting relative closing movement therebetween; a first cushioning element having a given solid height in said housing bearing against the transverse wall; a second cushioning element in said housing forwardly of said coil spring cushioning element; an intermediate follower between said first and second cushioning elements having a spring seat surface engaging said first cushioning unit and an abutment surface facing said transverse wall; said housing having an abutment surface intermediate said transverse wall and said intermediate follower for coaction with the abutment surface of said intermediate follower to limit travel of said intermediate follower toward said transverse wall; and a thrust transmitting friction cushioning element in said housing forwardly of said second cushioning element and projecting through said open end in thrust engagement with said front follower, said friction cushioning element including a front wedge reacting against the front follower, a rear wedge longitudinally spaced therefrom and reacting against the front of said second cushioning element, and laterally spaced wedge shoes positioned between and coacting with said front and rear wedges and having outwardly facing friction surfaces cooperating with said first mentioned friction surfaces; the arrangement being such that said friction cushioning element, said second cushioning element, and said first cushioning element act in tandem through said front follower and said housing to react between said front and rear lugs, with the longitudinal dimensions and cushioning characteristics of said tandem acting cushioning elements being such that, when the gear is in its release condition, the cooperating abutment surfaces of said front follower and housing are spaced apart a greater distance than are the abutment surface of said intermediate follower and said limit stops to the end that said first cushioning element is prevented from going solid and the final increment of gear closure is resisted by the second cushioning element.

4. In a draft gear for mounting in the draft pocket of railway cars, said pocket including spaced front and rear lugs: a housing having a transverse wall at one end and having the other end open, said housing having substantially longitudinally extending, inwardly facing, stationary friction surfaces therein; a front follower movable longitudinally relative to said housing; said housing and follower having cooperating abutment surfaces limiting relative closing movement therebetween; a coil spring cushioning element having a given solid height in said housing bearing against the transverse wall; a rubber cushioning element in said housing forwardly of said spring cushioning element; said housing having internal limit stops spaced from said transverse wall, a distance greater than the solid height of said spring cushioning element; an intermediate follower between said rubber cushioning element and said spring cushioning element and having an abutment surface facing said transverse wall for coaction with said limit stops to limit travel of said intermediate follower toward said transverse wall; a thrust transmitting friction cushioning element including a second intermediate follower bearing against the front of said rubber cushioning element, a rear wedge movable with said second intermediate follower, a front wedge longitudinally spaced from said rear wedge and reacting against the front follower, and laterally spaced wedge shoes positioned between and coacting with said front and rear wedges and having outwardly facing friction surfaces cooperating with said first mentioned friction surfaces, said friction mechanism being actuated during relative movement between the said front follower and said housing to translate at least a portion of the longitudinal forces applied to the gear into lateral forces to develop friction at said cooperating friction surfaces; the arrangement being such that said friction cushioning element, said rubber cushioning element, and said spring cushioning element act in tandem through said front follower and said housing to react between said front and rear lugs, with the longitudinal dimensions and cushioning characteristics of said tandem acting elements being such that, when the gear is in its release condition, the cooperating abutment surfaces of said front follower and housing are spaced apart a greater distance than are the abutment surface of said first-mentioned intermediate follower and said limit stops to the end that said spring cushioning element is prevented from going solid and the final increment of gear travel is resisted by the rubber cushioning element.

5. The arrangement of claim 4 wherein a group of intercalated stationary and movable friction plates disposed within the housing at each side thereof provide said inwardly facing friction surfaces, with the movable plates of said groups projecting longitudinally outwardly of the abutment surface on the housing that cooperates with the front follower for engagement with said front follower during a portion of the relative movement between said front follower and said housing.

References Cited in the file of this patent
UNITED STATES PATENTS

| | | |
|---|---|---|
| 1,650,381 | O'Connor | Nov. 22, 1927 |
| 1,844,234 | Wildin | Feb. 9, 1932 |
| 1,853,857 | Glascodine et al. | Apr. 12, 1932 |
| 2,440,714 | Dath | May 4, 1948 |
| 2,656,935 | Danielson et al. | Oct. 27, 1953 |